(12) United States Patent
Harper

(10) Patent No.: US 6,523,562 B2
(45) Date of Patent: Feb. 25, 2003

(54) PLUMBING FLOOD CONTROL SYSTEM

(76) Inventor: Roger Harper, P.O. Box 1405, Newnan, GA (US) 30264

( * ) Notice: Subject to any disclaimer, the term of this patent is extended or adjusted under 35 U.S.C. 154(b) by 0 days.

(21) Appl. No.: 10/054,007

(22) Filed: Jan. 11, 2002

(65) Prior Publication Data

US 2002/0062865 A1 May 30, 2002

Related U.S. Application Data

(63) Continuation-in-part of application No. 09/707,680, filed on Nov. 8, 2000, now abandoned.

(51) Int. Cl.[7] ............... F16K 3/02; F16K 3/18; G05D 7/03; G05D 7/06; G05D 7/12
(52) U.S. Cl. ............. 137/312; 137/392; 137/429; 200/81.5; 200/840 R; 200/183; 200/190; 307/118; 361/178
(58) Field of Search ............. 137/312, 387, 137/392, 487.5, 429; 122/504.2, 505, 507; 307/118; 340/604, 605, 620, 623, 624, 625; 361/178; 200/81.4, 81.5, 84 R, 84 B, 183, 190, 230; 73/305, 306, 307, 308

(56) References Cited

U.S. PATENT DOCUMENTS

| | | | | |
|---|---|---|---|---|
| 3,473,553 A | * | 10/1969 | Collins | 137/312 |
| 4,297,686 A | * | 10/1981 | Tom | 340/605 |
| 4,305,420 A | * | 12/1981 | Nussdorf | 137/312 |
| 4,324,268 A | * | 4/1982 | Jacobson | 137/312 |
| 4,589,435 A | | 5/1986 | Aldrich | 137/624.11 |
| 4,705,060 A | | 11/1987 | Goulbourne | 137/487.5 |
| 4,796,658 A | * | 1/1989 | Caple | 137/312 |
| 4,805,662 A | * | 2/1989 | Moody | 137/312 |
| 4,845,472 A | * | 7/1989 | Gordon et al. | 340/605 |
| 4,877,049 A | * | 10/1989 | Fornasari | 137/312 |
| 4,940,861 A | * | 7/1990 | Rizzuto | 307/118 |
| 5,000,224 A | | 3/1991 | Olson, Jr. et al. | 137/487.5 |
| 5,038,820 A | | 8/1991 | Ames et al. | 137/487.5 |
| 5,056,554 A | | 10/1991 | White | 137/486 |
| 5,086,806 A | | 2/1992 | Engler et al. | 137/486 |
| 5,161,563 A | * | 11/1992 | Thompson | 137/1 |
| 5,190,069 A | * | 3/1993 | Richards | 137/312 |
| 5,240,022 A | * | 8/1993 | Franklin | 137/312 |
| 5,240,028 A | * | 8/1993 | Hoch, Jr. | 137/312 |
| 5,437,303 A | * | 8/1995 | Johnson | 137/312 |
| 5,441,070 A | * | 8/1995 | Thompson | 137/1 |
| 5,655,561 A | * | 8/1997 | Wendel et al. | 137/312 |
| 5,967,175 A | * | 10/1999 | Bouzaglou | 137/312 |
| 5,992,218 A | * | 11/1999 | Tryba et al. | 137/312 |
| 6,170,798 B1 | * | 1/2001 | Johnson et al. | 251/68 |
| 6,186,162 B1 | * | 2/2001 | Purvis et al. | 137/312 |
| 6,336,469 B1 | * | 1/2002 | Nixon et al. | 137/312 |

* cited by examiner

Primary Examiner—George L. Walton
(74) Attorney, Agent, or Firm—Norman Rainer

(57) ABSTRACT

A control system for stopping a plumbing-related flooding situation in a building includes at least one sensor for accumulating water and producing a low voltage electrical control signal when sufficient water is accumulated. An actuating system receives the control signal and in turn routes 110 volt current to an electrically activated valve located in a main feed conduit of the plumbing system. The reopening of the valve is achieved by a manually operated electrical switch.

16 Claims, 3 Drawing Sheets

PLUMBING FLOOD CONTROL SYSTEM

RELATED APPLICATIONS

This Application is a continuation-in-part of U.S. patent application Ser. No. 09/707,680, filed Nov. 8, 2000 now abandoned.

BACKGROUND OF THE INVENTION

1. Field of the Invention

This invention relates to a system for preventing the flooding of a building as a result of water, entering the building through a supply conduit, and more particularly concerns a system for detecting flooding in said building and automatically closing said supply conduit.

2. Discussion of the Prior Art

Oftentimes, it is desired that the water supply to a house or other type of dwelling be shut off. This is particularly true when the householders are leaving their house for a prolonged period, as for example, when going on vacation. However, shutting off the main water supply valve is a chore which is often overlooked in the last minute preparations prior to leaving the house. Also, it may be desirable to leave the water supply in an active state in order to service an automatic lawn watering system, a fire extinguishing system, evaporative cooling systems or other ongoing functions.

The purpose of shutting off the water supply is to prevent damage to the house should an extensive leak occur while the householder is away. Rarely is the water supply into a house shut off when the householder is away for a short period of time, as for example, when at work. Yet, cumulative leakage from a burst pipe can cause tremendous damage to the house and contents even if discovered and stopped within a relatively short period of time.

Water shutoff systems shown in the prior art generally employ flow monitoring sensors intended to discriminate between normal water flow and abnormal flows attributable to leaks. Such systems monitor either instantaneous flow or flows, over a timed period, and send an electrical control signal to a shutoff valve. Such systems are disclosed, for example, in U.S. Pat. Nos. 4,589,435; 4,705,060; 5,000,224; 5,038,820; 5,056,554; 5,086,806 and elsewhere.

Water shutoff systems of the aforesaid nature usually involve expensive computerized equipment and generally require specialized programming for proper installation. There is also the possibility of denial of water service to essential but sporadically operating systems such as fire extinguishing systems, lawn watering and cooling systems.

In still other flood control systems, as disclosed in U.S. Pat. Nos. 4,324,268 and 5,240,022, sensors are disposed at floor level for detecting the presence of water, said sensors employing the water to complete an electrical circuit between two closely spaced electrodes. Such systems are unfortunately activated by the small amounts of water employed in the wet-mopping of floors, or small amounts of accidentally spilled water, as encountered in bathrooms and kitchens.

It is accordingly an object of the present invention to provide a system for detecting a plumbing-related flooding situation in a building, and turning off the water supply responsible for such flooding.

It is another object of this invention to provide a flood detection and control system which is easily installable into a building's plumbing system.

It is a further object of the present invention to provide a flood detection and control system of the aforesaid nature which is of simple, durable construction amenable to low cost manufacture and installation.

These objects and other objects and advantages of the invention will be apparent from the following description.

SUMMARY OF THE INVENTION

The above and other beneficial objects and advantages are accomplished in accordance with the present invention by a flood control system for use in conjunction with the plumbing system of a building having one or more floors and an electrical supply system, said control system comprising:

1) at least one sensor for detecting an accumulation of water, said sensor located at an elevation below the site of potential leakage of water from said plumbing system, and provided with means for transmitting an electrical control signal indicative of a detected accumulation of water, 2) an actuator system which receives said control signal and provides interaction with an electrical power supply, 3) an electrically activated valve located in a main conduit of said plumbing system and adapted to close said main conduit in response to a control signal from said sensor, and 4) means for achieving manually controlled reopening of said valve.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
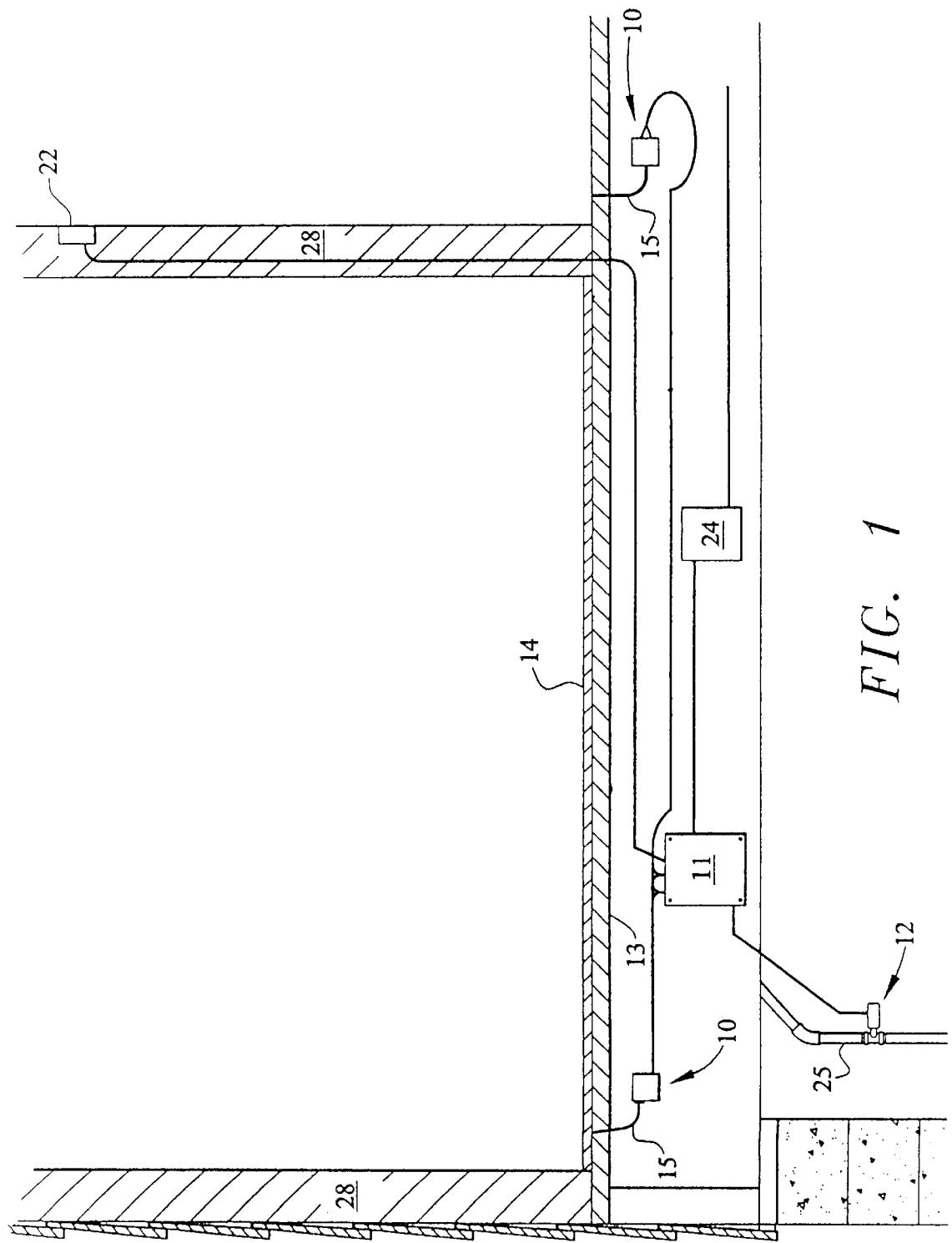
FIG. 1 is a schematic view of an embodiment of the flood control system of the present invention.
Figure 2:
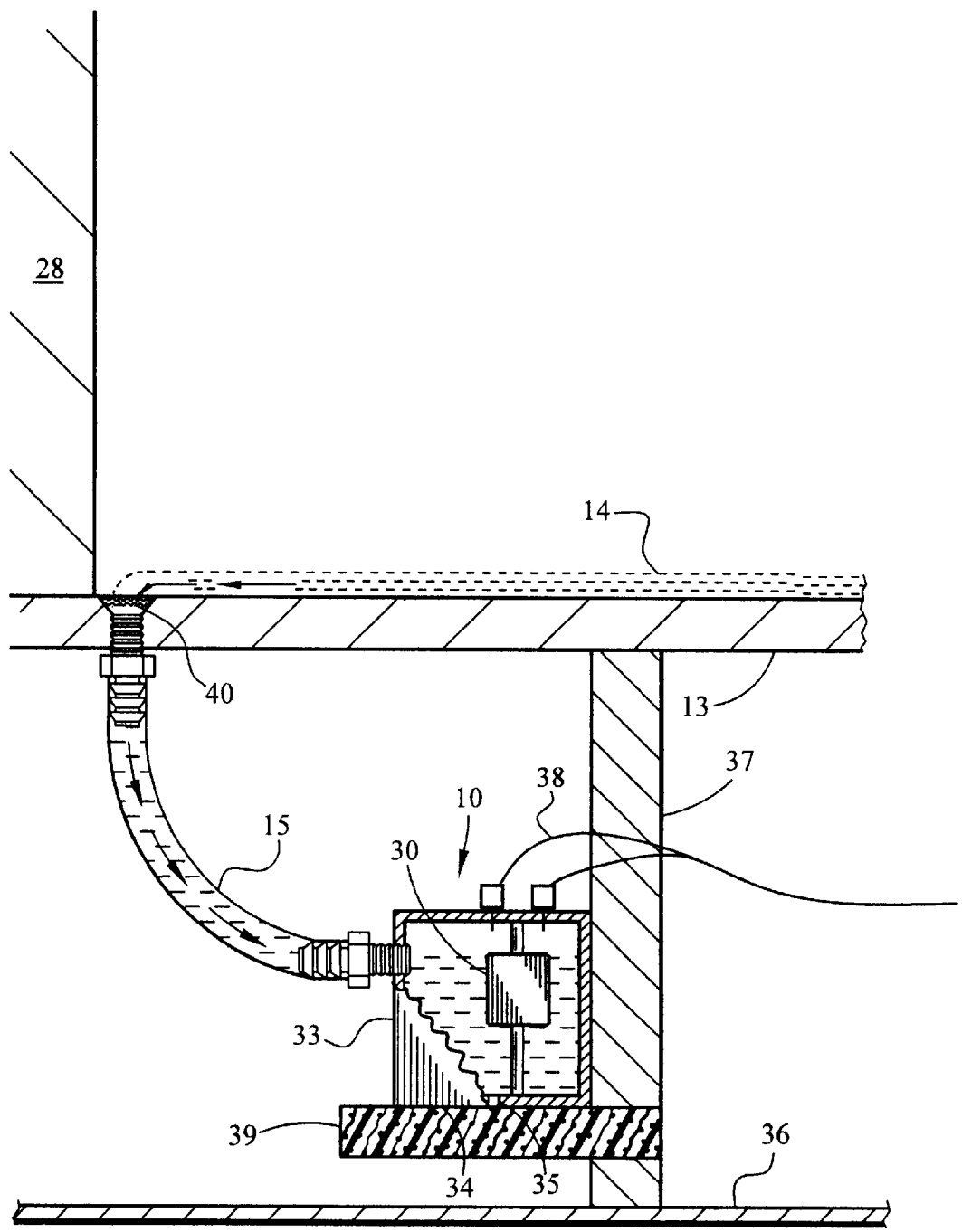
FIG. 2 is an enlarged fragmentary view of the embodiment of FIG. 1.
Figure 3:
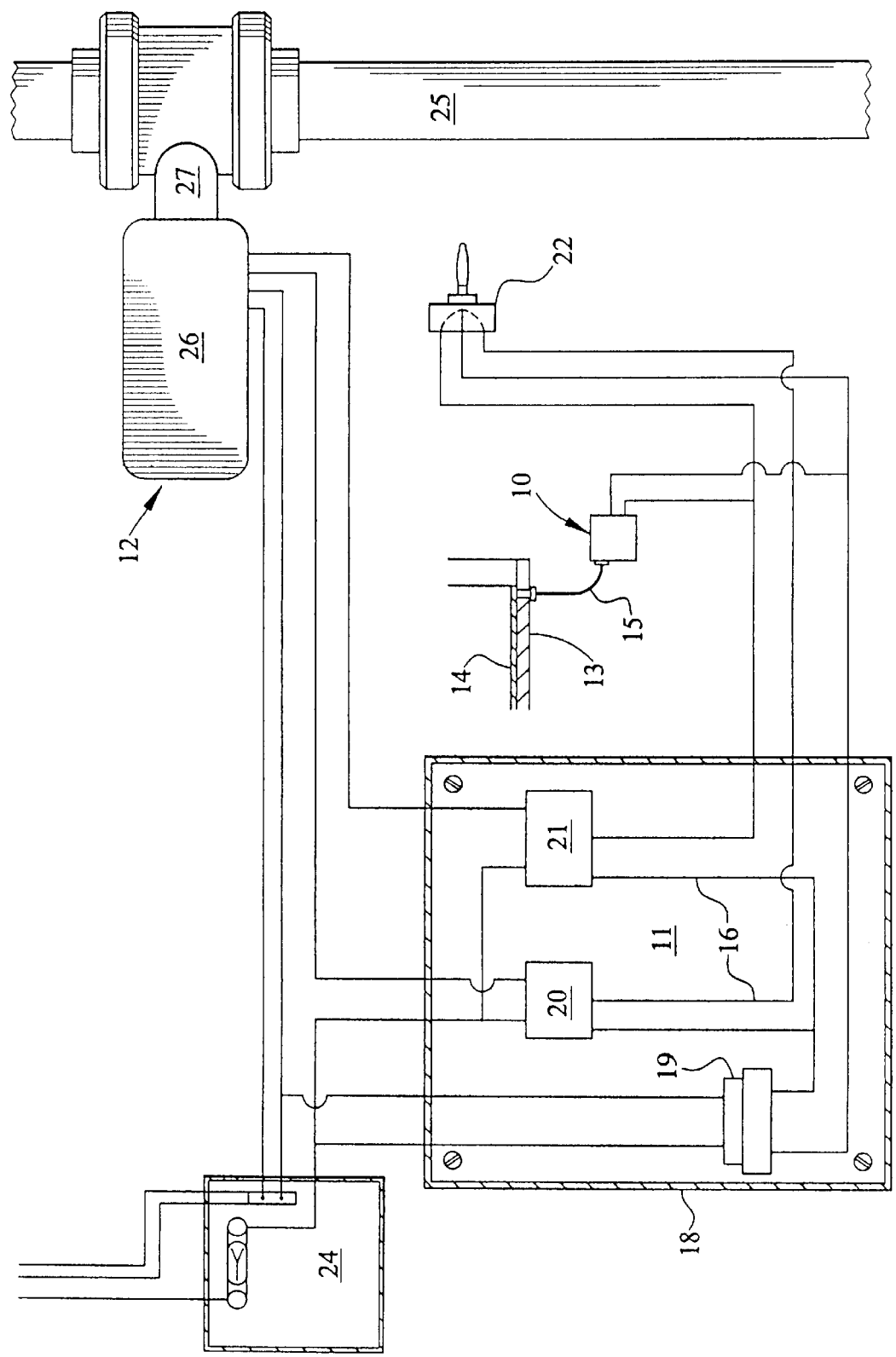
FIG. 3 is a schematic view of the electrical system that would be employed in conjunction with the embodiment of FIG. 1.

Referring now to FIGS. 1–3, an embodiment of the flood control system of this invention is shown comprised of water accumulation sensor 10 interactive with an actuator system housed in part within control panel 11, and electrically activated valve 12.

Sensor 10 is installed at a site in a building prone to flooding, and generally below a floor surface 13 where water 14 may accumulate and remain confined by an adjacent wall structure 28. In multi-floor buildings, the sensor is preferably disposed in the space between a floor surface 13 and underlying ceiling surface 36. In such disposition, the sensor is emplaced by insertion through an accommodating opening in said ceiling surface, then closing said opening as by patching. The sensor is preferably attached to a floor joist 37 below and adjacent wall structure 28. When the system of this invention is installed into a new building undergoing construction, the sensors are preferably emplaced before the underlying ceiling is installed. A number of said sensors may be positioned at strategic sites within the building being protected by the flood control system of this invention. Said building is further equipped with an electrical supply system, generally involving AC current of 110 to 120 volts.

Sensor 10 includes an accumulating housing 33 which preferably contains a float mechanism 30 and associated electrical switch mechanism 38 which becomes activated when water accumulates to a predetermined elevation within said housing. Suitable float mechanism switches useful in the practice of this invention are commercially available, one in particular being Model M8000, manufactured by the Madison Company of Branford, Conn. 06405.

Housing 33 is of small size and preferably cubical configuration, measuring between about 1.5 and 2.5 inches per side, and is capable of holding between about 50 and 200 cc of water. Bottom panel 34 of said housing contains a drainage aperture 35 of sufficiently small size that the emptying of all the water from said housing by gravity impetus requires at least 10 minutes. A water absorbent sponge 39 is preferably positioned beneath drainage aperture 35. The purpose of said sponge is to prevent the drained water from falling as a focused stream direction upon the underlying ceiling 36. Instead, said sponge dissipates the water and facilitates evaporation thereof. Suitable sponges include open-celled sponges of regenerated cellulose as sold for general kitchen uses, and manufactured by the OCelO Company of Tonawanda, N.Y. In those situations wherein the floor is a concrete slab, representing the foundation structure of the building, the sensor can be recessed into a hole formed in the concrete, said hole serving as an accumulating housing. A drainage aperture is provided, leading to the underlying ground.

A feed tube 15 conveys water by gravity flow into housing 33. Filter means such as screen 40 are preferably associated with the upper extremity of tube 15 to remove any debris that would otherwise clog aperture 35. When a sufficient level of water builds up within said housing, float mechanism 30 rises sufficiently to achieve completion of an electrical circuit which produces a control signal. When the float descends, said electrical circuit is broken.

A suitable electrical circuit, designated by numeral 16 in FIG. 3, preferably carries a 24 volt current, thereby minimizing any hazard involving the use of electrical current in a flood situation.

Control panel 11, protected by enclosure 18, is connected to a source of 110 Volt AC current, and contains a transformer 19 which produces a 24 Volt current that is routed to sensor 10. A stop relay 20, included in panel 11, is designed to receive 24 Volt current from sensor 10 in its flood-activated state, and in turn supply 110 Volt current to shut-off valve 12. Such action causes closure of the conduit serviced by valve 12. An open relay 21, included in panel 11, is activated by a manual on/off electrical switch 22 in a manner to cause reopening of valve 12.

Stop relay 20 and open relay 21 are of similar construction and functionality, each having an electromagnet activatable by 24V current to achieve completion of a 110V circuit, as by the bridging of two contact points. When not activated by said 24V current, a spring-urged retraction movement disconnects said bridging. Relays suitable for use as stop relay 20 and open relay 21 are Model 90-290Q, SPNO type made by the Steveco Company.

Shut-off valve 12 is positioned within the main water supply line 25 for the building wherein the flood control system of this invention is installed. Said valve is activated by 110 Volt current, and preferably employs a ball type of valve mechanism. A suitable shut-off valve for use in the practice of the present invention is Series EA Automatic True Union Valve, made by Hayward Industrial Products, Inc. of Elizabeth, N.J. Said Series EA valve is comprised of a drive component 26 having a high torque motor interactive by way of a gear train with a valve component 27. Said valve component preferably employs seats of Teflon polytetrafluoroethylene.

The ball valve component 27 of shut-off valve 12 is configured such that about three seconds of time are required for rotation between open and closed positions. Said ball valve component is also equipped with electrical contacts which, in the course of said rotation, make or break the 110V current circuit that energizes drive component 26 for either open or closed valve positions. This constitutes a fail-safe feature which prevents continuous flow of 110V current to component 26 in the event that float mechanism 30 of sensor 10 is caused to reside in its highest elevation by virtue of a large flow of water.

Electrical switch 22 is a "momentary switch" which remains in a constant "neutral" position that permits automatic operation of the flood control system. It requires manual manipulation to effect on/off control of valve 12. To effect the reopening of valve 12 following a shut-down dictated by a sensor, switch 22 must be held in one extreme position, such as upwardly directed. Such action routes 24 volt current to relay 21, which in turn routes 110V current to valve 12 to achieve reopening. Switch 22 must be held in said extreme position for at least 3 seconds to permit adequate rotation of the ball valve, and is preferably held for 6 to 10 seconds for assured rotation. Similarly, valve 12 can optionally be closed by holding switch 22 in its second extreme position, such as downwardly directed. After a leak has been detected by a sensor, and time-consuming repairs are needed, it is important to have the aforesaid ability to manually control the reopening of valve 12.

A pull-out type of electrical disconnect switch 24 is positioned in a manner to enable the rapid and safe cut-off of the 110 Volt current directed toward control panel 11. A suitable disconnect switch useful in the practice of this invention is model OT30SG made by the Square D Company of Palatine, Ill.

In the operation of the installed flood-control system of this invention, sensor 10, when activated by accumulated water, causes valve 12 to shut-off water supply to the building. When water drains out of housing 33, stop relay 20 automatically resets itself. However, restoration of water flow through supply line 25 is accomplished by operation of manual on/off switch 22. Such features of operation ensure that whatever condition which caused the flooding is remedied before water service is reestablished.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A flood control system for use in conjunction with the plumbing system of a building having one or more floors and an electrical supply system, said control system comprising:

1) a number of sensors for detecting an accumulation of water, each sensor located at an elevation below a floor where potential leakage of water may occur from said plumbing system, and comprised of an accumulating housing having a bottom panel equipped with a drainage aperture for achieving emptying of water from said housing by gravity impetus, and provided with means for transmitting an electrical control signal indicative of a detected accumulation of water, 2) an actuator system which receives said control signal and provides interaction with said electrical supply system, and further provides a low voltage current serving as said control signal, and 3) an electrically activated valve located in said plumbing system and adapted to close in response to said control signal.

2. The control system of claim 1 wherein said accumulating housing contains a float mechanism which, upon rising, causes completion of an electrical circuit, thereby producing said control signal.

3. The control system of claim 2 wherein said electrical circuit which produces said control signal carries a 24 volt current.

4. The control system of claim 1 wherein said actuator system is protected by an enclosure.

5. The control system of claim 3 wherein said actuator system is connected to said electrical supply system, and contains a transformer for producing said 24 volt current.

6. The control system of claim 5 wherein said actuator system further includes a stop relay which receives said control signal and in response thereto routes 110 volt AC current from said electrical supply system to close said electrically activated valve.

7. The control system of claim 6 wherein said actuator system is further provided with an open relay activated by a manual switch in a manner to cause reopening of said electrically activated valve.

8. The control system of claim 6 further containing a pull-out type of electrical disconnect switch for rapidly and safely cutting off the supply of 110 volt current to said actuator system.

9. The control system of claim 1 wherein a feed tube conveys water into said housing from an overlying floor surface.

10. The control system of claim 9 wherein filter means are associated with said feed tube adjacent said floor surface.

11. The control system of claim 9 wherein water dissipating means are disposed below said drainage aperture.

12. The control system of claim 11 wherein said water dissipating means is an open-celled, water-absorbent sponge.

13. A kit comprising the components of claim 1.

14. The control system of claim 1 wherein said accumulating housing can hold between 50 and 200 cc of water.

15. The control system of claim 1 wherein said electrically activated valve is comprised of motor drive means and a ball valve.

16. The control system of claim 15 wherein said ball valve includes means to make and break a 110 volt electrical circuit in the course of rotative movement between open and closed positions.

* * * * *